(12) United States Patent
Schnier (10) Patent No.: US 11,644,059 B2
(45) Date of Patent: May 9, 2023

(54) TWO-PART NUT WITH HIGH PRESSING FORCE

(71) Applicant: Dietmar Schnier, Garbsen (DE)

(72) Inventor: Dietmar Schnier, Garbsen (DE)

( * ) Notice: Subject to any disclaimer, the term of this patent is extended or adjusted under 35 U.S.C. 154(b) by 79 days.

(21) Appl. No.: 17/431,755

(22) PCT Filed: Feb. 11, 2020

(86) PCT No.: PCT/EP2020/053373
§ 371 (c)(1),
(2) Date: Aug. 18, 2021

(87) PCT Pub. No.: WO2020/169395
PCT Pub. Date: Aug. 27, 2020

(65) Prior Publication Data
US 2022/0136553 A1 May 5, 2022

(30) Foreign Application Priority Data

Feb. 18, 2019 (DE) .......................... 102019104024.8
Apr. 30, 2019 (DE) .......................... 102019111237.0

(51) Int. Cl.
*F16B 37/08* (2006.01)
*F16B 31/04* (2006.01)

(52) U.S. Cl.
CPC .......... *F16B 37/0821* (2013.01); *F16B 31/04* (2013.01); *F16B 37/0892* (2013.01)

(58) Field of Classification Search
CPC ... F16B 37/0892; F16B 37/0821; F16B 31/04
USPC ................................ 411/433, 41.5, 916, 917
See application file for complete search history.

(56) References Cited

U.S. PATENT DOCUMENTS

| | | | | |
|---|---|---|---|---|
| 2,257,327 A | * | 9/1941 | Bradford | ............. F16B 37/0821 411/433 |
| 2,377,581 A | * | 6/1945 | Shaffrey | ............. F16B 37/0892 411/433 |
| 3,038,366 A | * | 6/1962 | Hindman | ............ F16B 37/0892 411/433 |

(Continued)

FOREIGN PATENT DOCUMENTS

| | | |
|---|---|---|
| DE | 690 00 653 T2 | 5/1993 |
| EP | 0 408 239 B1 | 12/1992 |

(Continued)

*Primary Examiner* — Flemming Saether
(74) *Attorney, Agent, or Firm* — Muirhead and Saturnelli, LLC (57) ABSTRACT

A nut has two parts, each having a section of an internal thread which is radially slidable onto an external thread. The nut parts have cooperating connecting elements which permit relative displacement in a direction extending radially with respect to the axis of the internal thread until reaching a use position in which the internal thread of the nut engages around the external thread with a small clearance. The connecting elements have guide surfaces which guide the nut parts in a rotational movement about an axis of rotation extending transversely to the axis of the internal thread when displaced into the use position. Each nut part has at least one first locking arm which has on one side a guide surface which induces the rotational movement when the nut parts are displaced and bears against a complementary guide surface on a second locking arm of the other nut part.

18 Claims, 9 Drawing Sheets

(56) References Cited

U.S. PATENT DOCUMENTS

| | | | |
|---|---|---|---|
| 4,078,470 A | * | 3/1978 | Zeranick, Jr. ....... F16B 37/0892 |
| | | | 411/432 |
| 4,556,352 A | * | 12/1985 | Resnicow ................. F16D 1/06 |
| | | | 411/433 |
| 4,621,730 A | | 11/1986 | Mancusi |
| 4,622,730 A | | 11/1986 | Steinbock |
| 4,927,305 A | | 5/1990 | Peterson |
| 5,075,950 A | | 12/1991 | Steinbock |
| 5,083,889 A | | 1/1992 | Steinbock |
| 6,112,396 A | | 9/2000 | Steinbock |
| 2009/0053010 A1 | | 2/2009 | Schnier |

FOREIGN PATENT DOCUMENTS

| | | |
|---|---|---|
| EP | 1 982 082 B1 | 10/2008 |
| GB | 2469829 A | 11/2010 |
| WO | WO 2017/218870 A1 | 12/2017 |
| WO | WO 2019/014097 A1 | 1/2019 |

\* cited by examiner

TWO-PART NUT WITH HIGH PRESSING FORCE

TECHNICAL FIELD

The system described herein relates to a nut with an internal thread and two nut parts and more particularly to a nut where each of the nut parts has a section of the internal thread which is radially slidable onto an external thread.

BACKGROUND

A two-part nut is known from European patent EP 1 982 082 B1, the disclosure of which is incorporated by reference herein.

SUMMARY OF THE INVENTION

On the two nut parts of the nut in EP 1 982 082 B1, there are cooperating connecting elements with guide surfaces, which in the use position of the nut parts cooperate in such a way that a radial displacement of the nut parts, directed out of the use position and away from the external thread, is blocked. To reach the blocking use position, the parts of the nut are not only displaced in the radial direction, but are also rotated or pivoted about an axis of rotation running transversely to the axis of the internal thread. This rotational movement is only possible when the screw connection is loosened. When the screw connection is tightened, the nut is supported at one contact surface or a plurality of contact points that are supported on an opposing supporting surface which is connected to the external thread in an axially non-displaceable manner. At least one nut part has at least one locking arm. The locking arm has two sides facing in opposite directions with respect to the thread axes. The sides may also be referred to as the top side and the bottom side, if it is assumed that the thread axis is from top to bottom. Only one of these two sides of the locking arm has a guide surface which induces the rotational movement and which bears against a complementary and oppositely facing guide surface of the other nut part. The other side of the locking arm may in practice form the outer or axial end surface of the nut part (top side or bottom side) and bear against a supporting surface of a component against which the nut is tightened.

The locking arm with the guide surface on the first nut part as well as the cooperating section of material on the second nut part may have great material thicknesses. It is possible that the material thickness of the material sections each corresponds to half the total thickness of the nut. This makes it possible to achieve high stability and load-bearing capacity of these material sections and thus of the nut as a whole. Furthermore, the guide surface of the locking arm as well as the guide surface cooperating therewith can extend over the entire length of the nut. This results in a large load-bearing surface and therefore a high load-bearing capacity.

If the contact surface of the nut, which is formed by its underside when it is screwed onto a vertical external thread with a supporting surface at the bottom, is supported against the supporting surface in the screwed state, the pivoting of the nut parts is blocked and the nut can only be released from the external thread of the screw or threaded rod by unscrewing. If, on the other hand, after unscrewing by a few turns, the nut is at a certain distance from the supporting surface, it is possible to rotate or pivot the nut parts, which can then be separated from each other in the radial direction of the thread.

It should be noted that the axis of rotation running transverse to the axis of the internal thread does not necessarily have to run at right angle to the axis of the internal thread. It may also be oblique or skew with respect to the axis of the internal thread. In practice, however, the axis of rotation will usually lie approximately radial to the axis of the internal thread.

In other words, the nut has a distance of one or more threads from the opposing supporting surface when the nut is slid and pivoted onto the external thread. By screwing the nut through the number of turns corresponding to the number of threads, the nut is supported against the opposing supporting surface, thereby blocking the nut parts of the nut from pivoting again and loosening the nut parts from each other. The joining of the nut parts is facilitated by the fact that a guide surface that induces the rotational movement of the nut parts is arranged on one side of the locking arm. The opposite side of the locking arm, i.e. the side of the locking arm facing opposite to the guide surface with respect to the thread axis, forms an outer surface of the nut on its upper or lower side and can bear against a supporting surface when tightened. Since the locking arm interacts on one side with an opposing supporting surface to achieve the rotational movement, thickness of the locking arm is not critical and does not have to comply with any specific manufacturing tolerances.

The pivoting movement or rotational movement of the nut parts about an axis transverse to the axis of the internal thread when the nut parts are applied to the external thread thus ensures that the opposite movement is blocked when the nut parts are screwed tight. The nut formed by the nut parts is thus non-releasably fixed on the external thread.

A nut of this type has considerable handling advantages over conventional nuts. For example, it is not necessary to overcome the entire length of the external thread by screwing on the nut. When the nut is placed in its use position, the nut only has to be pushed on radially and pivoted and then tightened by a few turns. Both nut parts of the nut can also be fixed in a partially pushed-together position, in which the parts are pushed over the external thread to the desired position. Only here are the nut parts pressed against each other into the use position and then screwed tightly to the external thread.

It is also possible to apply a two-part nut to an external thread without a free end. For example, the nut can be applied to a threaded section that is bounded on both sides by thicker rod sections without threads. Consequently, the two-part nut allows for unusual types of connections, with easy handling and low-cost manufacturing.

In practice, the connecting elements of the nut parts comprise guiding surfaces which rest against each other and induce the rotation and which are inclined at an angle to the plane extending radially to the axis of the internal thread. This angle of the guide surfaces to the radial plane of the internal thread causes the nut parts of the nuts not to be displaced simply radially relative to one another but instead causes the parts additionally to be pivoted about an axis essentially in a radial plane of the internal thread.

In practice, the guide surfaces are preferably inclined at an angle of less than 20° to the radial plane of the internal thread. This means that the pivoting movement required to connect the nut parts is not excessive, and collision of the contours of the threaded sections of the nut parts with the external thread during the pivoting movement is avoided. If larger inclinations are desired, the colliding contours of the threaded sections would have to be removed. However, the guide surfaces can also have a variable inclination to the radial plane and, for example, be curved in a cylinder or twisted in a helix.

To achieve the pivoting movement, the guide surfaces may be arranged in various ways. In the case of a nut in which the internal thread sections of the two nut parts are separated along a parting plane extending in the direction of the thread axis, each part of the nut may have two guide surfaces arranged on either side of a central plane running at right angle to the parting plane. If the direction in which the guide surfaces extend is referred to as the longitudinal direction, the central plane forms the central longitudinal plane, the two guide surfaces extending on both sides of this central plane. Further, the two guide surfaces of a nut part may face in opposite directions with respect to the thread axis. Thus, assuming that the thread axis runs from top to bottom, then the surface normal of the first guide surface of a nut part will point upward and the surface normal of the second guide surface of the same nut part will point downward. The complementary nut part is designed accordingly. At least a part of the guide surfaces is arranged on the locking arms. This formation of the inclined guide surfaces can induce the pivoting movement if the guide surfaces have a suitable shape. For example, the guide surfaces can lie on a helical surface wound around a radial axis lying in the center plane, which predetermines a screwing movement when the two nut parts are pushed together. The two guide surfaces can also lie on a cylindrical surface whose cylindrical axis lies in the parting plane. In this case, the nut parts are pivoted with respect to each other about the cylinder axis when they are pushed together.

Alternatively, a nut consisting of two nut parts whose internal thread sections are separated along a parting plane extending in the direction of the thread axis may have flat guide surfaces that are not curved or twisted. To cause the pivoting movement, each nut part of the nut may have two guide surfaces on either side of the parting plane. The guide surfaces are in opposite directions with respect to the thread axis on the first side of the parting plane compared with guide surfaces on the second side of the parting plane. In other words, the guide surfaces of a nut part face upward on the first side of the parting plane and downward on the second side of the parting plane. Further, the guide surfaces on the first side of the parting plane are inclined in the opposite direction to the radial plane of the thread than guide surfaces on the second side of the parting plane. In other words, the planes in which the guide surfaces lie extend similar to a pointed roof whose gable lies on the thread axis. In this way, the nut parts can be slid into each other with the axes of the internal threaded sections of the nut parts slightly pivoted with respect to each other. In the final section of the sliding movement, the nut parts are pivoted into the use position, about a pivot axis extending radially to the thread axis and lying in the parting plane. In the use position, the axes of the internal thread sections of the two nut parts are substantially superimposed and the internal thread consisting of the two sections engages around an external thread of corresponding dimensions substantially without play. Then the nut thus formed can be screwed tight.

As mentioned, the guide surfaces can have a curvature in the form of a cylinder jacket section. In this case, the guide surface on the first nut part is shaped convexly, and the guide surface on the second nut part cooperating therewith is shaped concavely in accordance with the same cylinder jacket surface. In this way, the guide surface can guide the approach movement of the two nut parts over a longer movement path along the cylinder jacket surface.

In practice, the axis of the internal thread may coincide with a radius of the cylinder, on the jacket surface of which the guide surfaces run. Also, the parting of the nut parts may lie in a plane diametrically intersecting the cylinder. Rotation of the nut parts during movement to the use position is then executed by displacement of the cylinder-jacket-shaped guide surfaces relative to one another essentially about the axis of the cylinder jacket lying in the parting plane of the nut parts.

As also noted above, in another practical embodiment, the guide surfaces may lie on a twisted surface. For example, the twisted surface runs around an axis that is perpendicular to the parting plane of the nut and radial to the axis of the internal thread and intersects the thread axis approximately in the center of the internal thread. In this case, the nut parts are not rotated about an axis lying in the parting plane during assembly, but are rotated about the axis running perpendicular to the parting plane of the nut along a screw movement.

In practice, the material of the nut, usually steel but also plastic depending on the application, can be elastically deformable. The shape of two mutually abutting guide surfaces of the nut parts may differ slightly. The surfaces may have slightly different curvatures or be inclined to each other. Both features result in a certain deformation of the nut parts when the pressure acting in the direction of the axis of the internal thread is increased by tightening the nuts until the guide surfaces lie flat against each other. In this case, the guide surfaces of the nut parts assume the function of a washer or spring washer and additionally secure the screw connection against loosening due to dynamic load changes. The same applies if the underside of the nut parts rests with only one or two contact points on the supporting surface below. The supporting surface is the surface fixed in the axial direction to the external thread, against which the nut is supported when tightened. If this support is provided by only one or two contact points per nut part, a torque is generated when tightened which deforms the nut parts elastically to some extent and tilts the nut parts in the process. The nut is thus under elastic tension, as when a washer is used, which ensures that the screwed joint is self-locking due to the tension when the screwed joint is subjected to a dynamic load.

In addition, the connecting elements of the nut parts can have guide surfaces that lie against each other in a plane extending parallel to the axis of the internal thread. This plane extending parallel to the axis of the internal thread preferably defines the direction of radial displacement of the two nut parts relative to each other. The additional guide surfaces thus effect the guidance of the nut parts in the radial direction of the thread, but not the rotational movement. Furthermore, additional guide surfaces in an axial plane (also called vertical plane) form the stops for the displacement of the nut effective in the use position. As already mentioned, these additional guide surfaces do not cause the nut parts to pivot in order to reach the use position and consequently do not cooperate in locking the nut parts together.

As mentioned, the fastening elements, which make it necessary to pivot the nut parts to reach their use position, have the effect that the nut is prevented from pivoting when tightened by the fact that a contact surface of the nut is supported against a supporting surface connected to the external thread. The contact surface of the nut does not have to be full-surface. It is sufficient if each nut part of the nut has at least one, preferably two or three, contact points which rest against the supporting surface firmly connected to the external thread in the axial direction when tightened. The contact surface is formed by the side of the locking arm opposite the guide surface causing the rotation.

The contact surface of each nut part of the nut can have an inclined surface at one edge, which defines the angle of the pivoting movement of the nut part. For this purpose, the inclined surface has an angle to the contact surface which corresponds to the angle of rotation of the corresponding nut part when this nut part is moved into a use position of the nut part. In other words, the two nut parts can be pivoted by an angle corresponding to the pivoting angle from the assembly position to the use position by applying pressure to their edge. In this pivoted state, the nut parts can be pushed a little into each other by the supporting surface. In the final section of the movement, the nut parts are pivoted to their use position and then screwed tight, being locked due to the support of the nut contact surface against the supporting surface.

Similarly, a nut with point contact can be formed. A contact point of a nut part should define with at least two further points in the edge area of the nut part an inclined surface, the angle of which corresponds to the angle of rotation about which the nut part is rotated during assembly. Again, pressing on the edge area can cause the nut part to pivot to the assembly position. In this position, the nut part can be pushed into the complementary nut part by a certain amount. Subsequently, the manual pivoting movement takes place, whereby the threaded sections of both nut parts wrap around the external thread and the use position is reached.

In practice, in at least one end region of the internal threaded section of at least one of the nut parts, the threads may be removed to allow rotation of the nut parts during the pivoting movement to the use position. Depending on the selected path of movement of the relative movement of the nut parts with respect to each other, removal of the thread turns avoids blocking of the closing movement. In this case, the internal thread sections can strike against the external thread by a small amount during the pivoting movement, so that elastic deformation of the nut parts is required during the closing movement into the use position. This causes the nut parts to snap around the external thread and the nut parts can only be released from the external thread again by applying increased force, which causes the above-mentioned elastic deformation.

The two-part nut can of course also have a self-tapping thread. In this case, the removal in the area of the thread can be selected so that the thread cuts the threads of the external thread like a tap. This would allow the nut to be used even more effectively on soft materials without threads, such as plastic rods or plastic-sheathed cables, for example as strain relief on power cables.

By special design of the nut, the two nut parts of the nut can be identical. This is readily possible, for example, in the case of a double-start thread, if nut parts are rotationally symmetrical, i.e. identical to each other when rotated through 180°, with respect to the thread axis or an axis of symmetry running in the nut parting plane and radially to the thread axis. In the case of a conventional single-start thread, the identical nut parts can be rotationally symmetrical with respect to an axis of symmetry located in the nut parting plane and extending radially to the thread axis. In this case, the nut parts preferably have an upwardly directed and a downwardly directed inclined surface arranged on two locking arms extending at right angles to the nut parting plane, which act as connecting elements. These inclined surfaces rest on the opposite inclined surfaces of the complementary nut part during joining. The nut parts are displaced towards each other and screwed into each other during joining.

A nut consisting of two identical nut parts has the advantage that the nut can be produced in large numbers at very low cost. In particular, each nut part of the nut can be produced in one compression molding operation. In addition, the user can connect any nut parts together and does not have to pick out two nut parts that match each other.

In the case of nuts with single-start internal threads which may have symmetrical external shapes but whose threads are not symmetrical, as well as in the case of asymmetrical nut parts, there is a risk that the user will attempt to assemble the nut parts incorrectly. The top and bottom of such nut parts may be additionally marked, for example by indentations or other markings, to prevent errors during assembly. However, incorrect assembly can also be prevented by suitable shaping of the connecting elements, in that the external symmetry exists only with respect to one axis and is cancelled with respect to the second axis by different design of the guide surfaces. In this case, the nut parts obviously cannot be joined together incorrectly.

In addition, the nut parts of the nut can include cooperating retaining elements which fix these nut parts to each other in the use position or shortly before, i.e. in at least partially pushed-together position. Without such retaining elements, there is a risk that when the nut is screwed onto the external thread, the nut parts will unintentionally separate from each other as long as the contact surface is not firmly supported against the supporting surface.

The retaining elements can, for example, be formed by magnets attracting each other or a magnet and a ferromagnetic material section. However, positively interlocking retaining elements such as latching projections and complementary latching recesses are also possible, which ensure latching of the nut parts of the nut in the use position. Fixing of the nut parts to the external thread or to each other can also be achieved by other suitable measures, in particular shaping of the connecting elements (undercuts, deformation of the nut, friction/tension on the external thread and on each other).

The two-part nut can be used as follows. When the nut parts are pushed together in the radial direction, in addition to the displacement of the nut parts, at least in the last movement section, shortly before the use position, there is a rotation or pivoting of the nut parts about an axis of rotation running transverse to the axis of the internal thread.

During this rotation, two complementary curved guide surfaces of the nut parts can slide on each other.

As mentioned, each of the nut parts can be placed on a supporting surface connected to the external thread with an inclined surface located in its edge area. This gives the nut parts an inclined position relative to one another, which promotes interlocking of the nut parts. The nut parts are thus moved towards each other in an assembly position in which their connecting elements interlock and subsequently guide the further movement of the nut parts.

In the region of one end of the internal thread, the nut can have a shoulder extending towards the axis of the internal thread. The shoulder preferably has an annular shape projecting towards the center of the internal thread and half of the shoulder is arranged on each nut part. The shoulder projecting radially inwardly can engage around a radial shoulder of an object to be screwed to an external thread by means of the nut, e.g. a pipe socket, in the manner of a union nut and press against an end wall of the external thread when the nut is screwed tight. The radial shoulder can be formed by a wall of a groove adjoining the internal thread. Unlike conventional screws, it is not necessary for the radial shoulder of the object to be screwed tight to be pushed through the internal thread before the radial shoulder of the object rests against the inwardly projecting shoulder. When the nut is pushed together, the radial shoulder of the object can be inserted into a groove in which the radial shoulder is accommodated with a small clearance. For this reason, it is also not necessary for the radial shoulder and the groove or the shoulder of the nut to be round. The radial shoulder and the groove or the shoulder of the nut can have complementary shapes that deviate from the round shape and be positively inserted into each other when the nut parts are pushed together.

Finally, EP 1 982 082 B1 discloses a tool for attaching a nut of the type described above. The tool has a holding device for each nut part of the nut. The holding devices are coupled to one another via drive means, in particular articulated joints and lever connections, in such a way that the holding devices either actively execute or at least passively permit the displacement and pivoting movement of the nut parts. First, the holding devices perform a displacement movement relative to each other in a direction extending radially to the axis of the internal thread. Subsequently, at least in the last movement section before the nut parts of the nut have reached the use position, the holding devices perform a pivoting or rotational movement about an axis of rotation extending transversely to the axis of the internal thread. For this purpose, the holding device can either be driven in the specified path of movement or at least have the required degrees of freedom by means of joints.

To open the nut, the tool can perform a counter-rotating movement. The tool can, for example, be of the pliers type, with the holding devices forming the two jaws of the pliers. The holding devices are driven via any gear by the two levers of the pliers in such a way that the pivoting movement or rotational movement required to reach the use position is executed. Particularly in the case of nut parts with retaining elements, the tool can ensure that the retaining force of the retaining elements is securely overcome to release the nut parts if manual removal of the nut parts from the external thread is not possible.

The nut described above of EP 1 982 082 B1 enables durable and secure tightening in a wide range of applications. The axial contact force of this nut essentially achieves values corresponding to those of the axial contact force of conventional nuts.

Another quick-release nut for attachment to a threaded section of a bolt is known from publication GB 2 469 829 A, which teaches a first and a second section, each having a semi-cylindrical internal thread. A hinge plate is pivotally connected to the first section and is slidably connected to the second section so that the second section is radially and pivotally movable with respect to the first section. A snap latch removably connects the first and second sections. A similar quick-action clamping nut emerges from DE 690 00 653 T2. Here, the first and second sections are connected by two connecting bolts extending to either side of the internal thread.

From the publications U.S. Pat. Nos. 4,622,730 A, 4,927, 305, 5,075,950 A, 5,083,889 A and 6,112,396 A, tensioning elements with multiple bolts or screws are known which allow high pretensioning forces to be precisely applied. For this purpose, the nut bodies of the tensioning elements have pressure threads into which pressure screws are screwed. The pressure screws allow high pressure forces to be generated with relatively low tightening torque, which cannot be achieved at all or only with extremely high tightening torque by turning a conventional threaded nut.

It is desirable to adapt the design of the two-part nut in such a way to enable high contact pressure forces to be generated.

According to the system described herein, a two-part nut of the type described herein and known from EP 1 982 082 B1 has a plurality of pressure threads arranged around the internal thread and receiving the pressure screws that can be screwed out in the axial direction from a first axial end face of the nut and have a receiving means for a screwing tool in the region of a second axial end face of the nut, wherein at least one pressure thread is arranged in the first locking arm, which has the first axial end face, and where the second locking arm with the second axial end face, which cooperates with the first locking arm, has a recess through which recess the pressure screw projects.

In order to be able to arrange a sufficient number (e.g. 4, 6 or 8) of pressure screws in the material surrounding the internal thread, it is useful that at least one pressure screw is arranged in a pressure thread in a locking arm. To make this possible, a recess is arranged in the second locking arm cooperating with the first locking arm and having the second axial end face, which recess is penetrated by the pressure screw. The contour of the recess is to be selected so that, when the two-part nut is opened from the closed use position to an open position in which the internal thread of the nut can be slid over a complementary external thread, the pressure screw is free to move within the recess without obstructing the displacement of the mutually movable nut parts.

The pressure threads can be arranged around the internal thread in such a way that no tilting moment occurs. For this purpose, the pressure threads can, for example, be arranged at regular angular intervals and/or diametrically opposite each other in pairs along a circle around the internal thread.

In practice, the recess is formed as an elongate hole that guides the pressure screw when the second nut part is displaced relative to the first nut part from the use position to the open position.

The first locking arm with the pressure thread thus interacts with the second locking arm. The pressure thread opens into the guide surface of the first locking arm. The elongate hole opens into the guide surface of the second locking arm and extends in axial extension of the pressure thread when the nut parts of the nut are in the use position or slightly open between the use position and the open position, which allows the internal thread of the nut to slide on a complementary external thread. The course of the center line of the oblong hole is chosen in such a way that the movement of the pressure screw is possible during opening and closing by sliding the two nut parts relative to each other. During movement, the pressure screw is guided within the elongate hole. The pressure screw in the area of the locking arms thus not only fulfills the function of generating the pressure force but also fixes the nut parts to each other, thus facilitating handling of the nut parts.

The elongate hole has a course and a dimension which allow the nut parts to be swung open from the use position to an open position in which the open nut can be displaced in the axial direction along an external thread which is designed to be complementary to the internal thread. In this way, the nut can be moved quickly and easily over long lengths of the external thread. It is further possible to limit the dimensioning of the elongate hole so that the nut parts cannot be detached from each other without removing the pressure screw projecting through the elongate hole. Since the nuts described here generally have very large internal threads, the step-by-step fastening of the nut parts facilitates handling. In a first step, the first nut part is connected to the second nut part by inserting the pressure screws through the elongate holes in the second locking arm and screwing the pressure screws into the pressure thread of the first locking arm. During this process, the open nut can already engage around a threaded rod. In the open position, the open nut can be moved axially along the external thread of the threaded rod. Next, the nut is moved to the closed use position. To do this, the two nut parts are moved towards each other and pivoted. In the use position, the nut grips the external thread with a small thread play and can thus generate a pressing force against a supporting surface in an axial direction. By resting against the supporting surface, the nut parts are fixed against each other in the use position. In the final step, the pressure screws are tightened and generate the specified pressure force.

In practice, the internal thread sections of the two nut parts may be separated along a parting plane extending in the direction of the thread axis. In this case, each nut part of the nut may have two locking arms arranged on either side of a central plane extending at right angles to the parting plane. In this way, it is possible to attach pressure screws to the nut in a substantially symmetrical manner diametrically opposite each other, which fix the locking arms.

In practice, the guide surfaces can be inclined or curved. In connection with the drawings, an embodiment with guide surfaces curved along a cylindrical jacket is described. The nut parts are displaced relative to each other in a direction perpendicular to the parting plane of the internal thread, sliding on the cylindrically curved guide surface. In this case, the elongate hole for the pressure screw can extend substantially straight and be milled into the locking arm. In other embodiments, when the guide surfaces of the locking arms extend at an angle or on a twisted surface, the elongate holes may be twisted so that the pressure screw can follow the rotational movement of the nut parts. Such elongate holes can be produced using additive manufacturing processes.

In practice, each nut member may have at least one pressure thread in a region where the nut member extends from the first axial end surface to the second axial end surface. Regions without locking arms are substantially adjacent to the internal thread section of the respective nut part. Overall, the pressure screws are to be distributed regularly along the circumference of the internal thread. The more pressure screws there are, the lower the required tightening torque of each pressure screw.

As explained above, the pressure screw, which protrudes through the recess or elongate hole of the second locking arm and is screwed into the pressure thread of the first locking arm, can displaceably but inseparably connect the two nut parts. To separate the nut parts, it is necessary to unscrew the pressure screw from the pressure thread. It is possible to open and close the internal thread with the pressure screw screwed in, but not to separate the nut parts from each other.

BRIEF DESCRIPTION OF DRAWINGS

A practical embodiment and further advantages of the system described herein are described below in connection with the drawings.

DESCRIPTION OF VARIOUS EMBODIMENTS

FIGS. 1-4 show a fastening and tensioning arrangement with an embodiment of the nut according to the system described herein. The nut consists of two nut parts 1, 2 and corresponds in its mode of operation to the embodiment of FIGS. 9-13 of EP 1 982 082 B1. The nut is shown isolated and enlarged in FIGS. 5 to 7 and the individual nut parts can be seen in FIGS. 8 and 9.

The nut part 1 has a first, internally threaded section 3 extending over 180°. The second nut part 2 has the second, opposite internal thread section 4, which also extends over 180°. The two internal thread sections 3, 4 are divided in a parting plane containing the axis of the internal thread. Each of the nut parts 1, 2 has two locking arms 5,6 and 7,8, respectively. In this case, the two locking arms 5,6 and 7,8 of each nut part 1 and 2, respectively, extend on both sides of a center plane that is perpendicular to the parting plane of the internal thread.

The two locking arms 5, 6 and 7, 8 of the two nut parts 1 and 2 respectively each have a curved guide surface 9-12 which runs essentially radially to the axis of the internal thread. The two guide surfaces 9, 10 or 11, 12 of each nut part 1 or 2 face essentially in opposite directions. Thus, in the case of the first nut part 1, the guide surface 9 lying at the front for the observer in FIG. 7 faces upwards and the guide surface 10 lying further back faces downwards. Correspondingly and additionally, on the second nut part 2, the guide surface 11 of the second nut part 2 lying at the rear in FIG. 7 faces upward and the guide surface 12 of the nut part 2 lying further forward faces downward. On the first nut part 1, the upward-facing guide surface 9 forms the upper side of the first locking arm 5, which rests with its underside on the supporting surface 23 (see FIG. 1). In the use position, the downward-facing guide surface 12 of the second nut part 2 rests against the upward-facing guide surface 9 of the first locking arm 5 of the first nut part 1. The guide surface 12 is associated with the second locking arm 8 of the second nut part 2, which rests on the locking arm 5 of the first nut part 1 away from the supporting surface 23.

Accordingly, the downward-facing guide surface 10 on the second locking arm 6 of the first nut part 1 rests against the upward-facing guide surface 11 of the first locking arm 7 of the second nut part 2. The use position is shown in FIG. 1.

Figure 1:
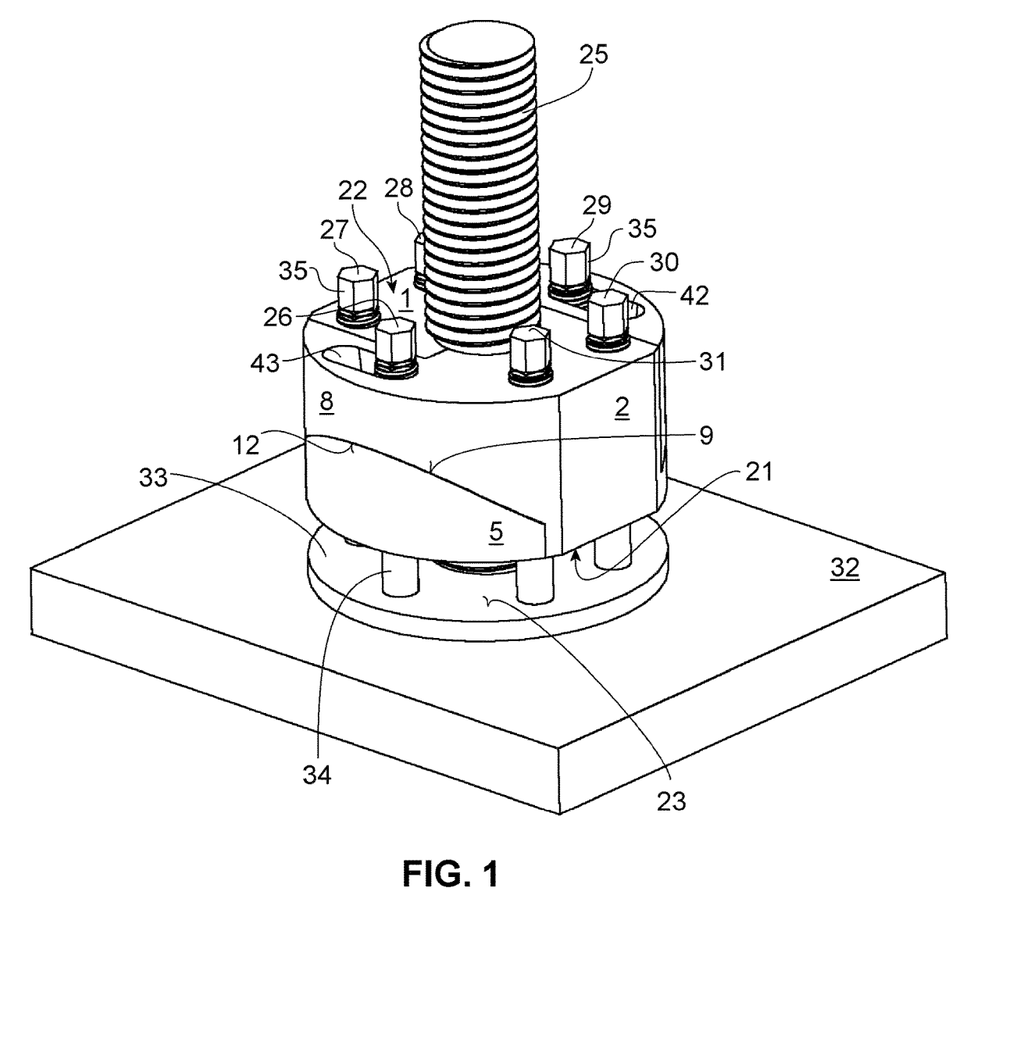
FIG. 1 shows a three-dimensional oblique side view of a fastening and tensioning arrangement with a two-part nut with pressure screws in the closed use position.
Figure 2:
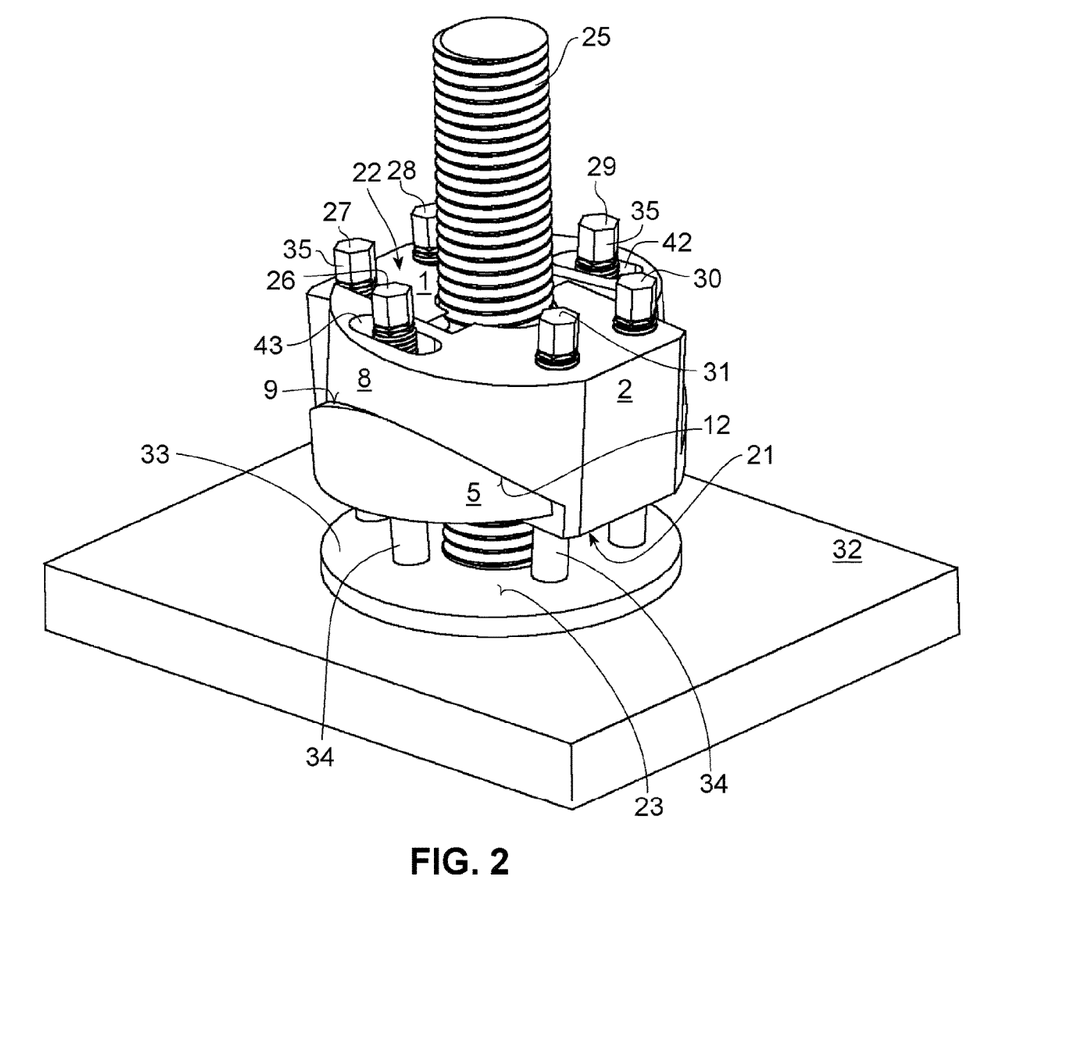
FIG. 2 shows a representation of the fastening and tensioning arrangement corresponding to FIG. 1 in the half-open position.
Figure 3:
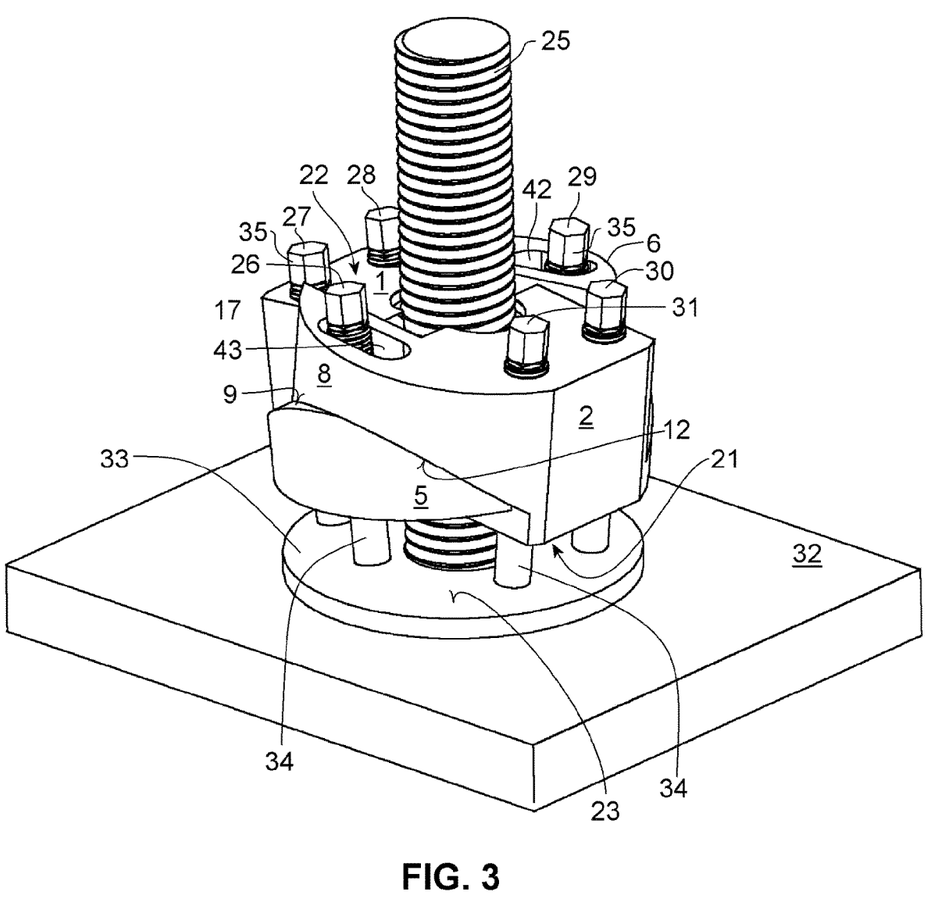
FIG. 3 shows a representation of the fastening and tensioning arrangement corresponding to FIGS. 1 and 2 in the fully open position.

The type of pivoting movement which the two nut parts 1, 2 perform relative to each other when opening results from the observation of FIGS. 1 to 3. In FIG. 3, the guide surfaces 9 and 12 rest against each other, but the nut parts 1, 2 are pivoted open to such an extent that they can be pushed without problems onto an external thread 25 which is complementary to the internal thread. In FIG. 1, the nut parts 1, 2 are pivoted into the use position in which the internal thread is closed and positively surrounds the external thread 25 with a small clearance. All curved guide surfaces 9-12 extend along a common cylindrical surface, which is curved about a cylindrical axis at right angles to the thread axis, which lies in the parting plane of the internal thread. In this way, the two nut parts 1, 2 are joined together or released from each other by pivoting about the said cylinder axis along this cylindrical surface.

Tilting of the nut parts 1, 2 about an axis running parallel to the locking arms 5-8 during pivoting along the cylinder jacket-shaped guide surfaces 9-12 is prevented by additional flat guide surfaces 13-20 lying against each other, which extend parallel to the axis of the internal thread and in the direction of displacement of the nut parts, i.e. perpendicular to the parting plane of the internal thread. The flat guide surfaces 13-20 are in contact with each other in pairs.

Figure 4:
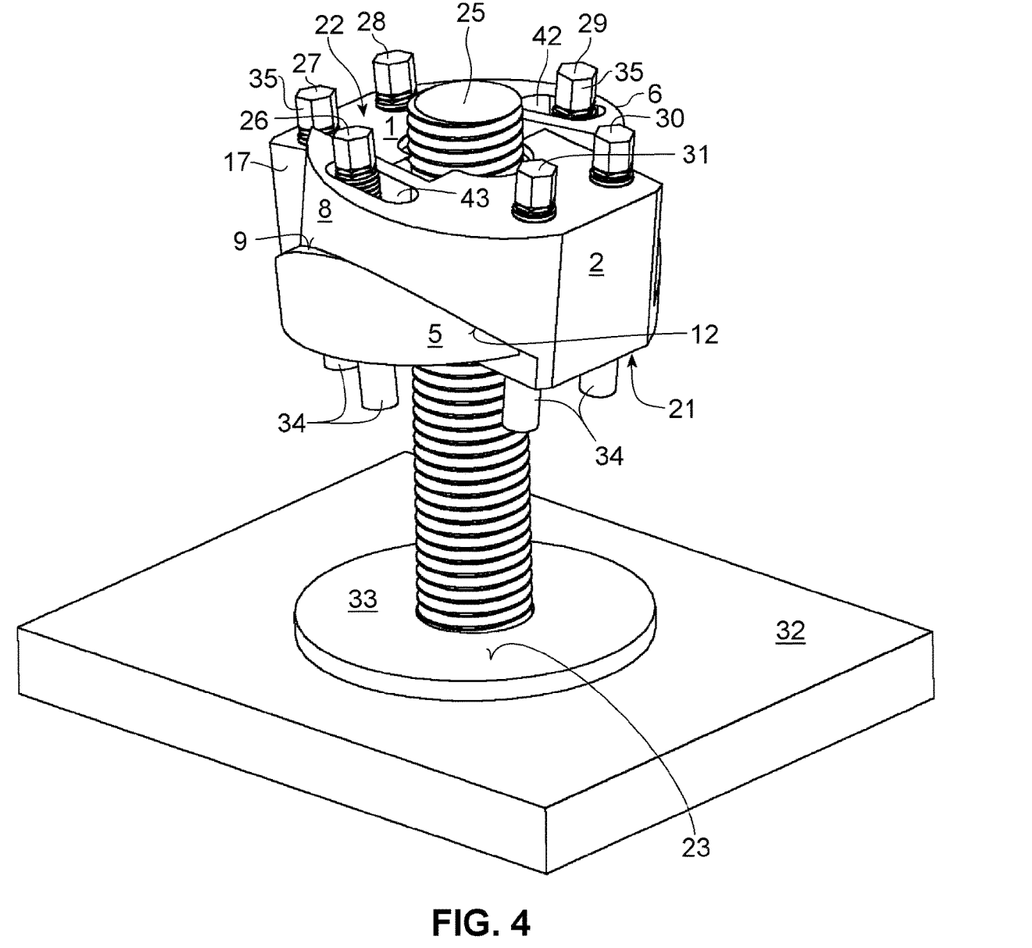
FIG. 4 shows an illustration corresponding to FIG. 3 with the nut lifted from the supporting surface.
Figure 5:
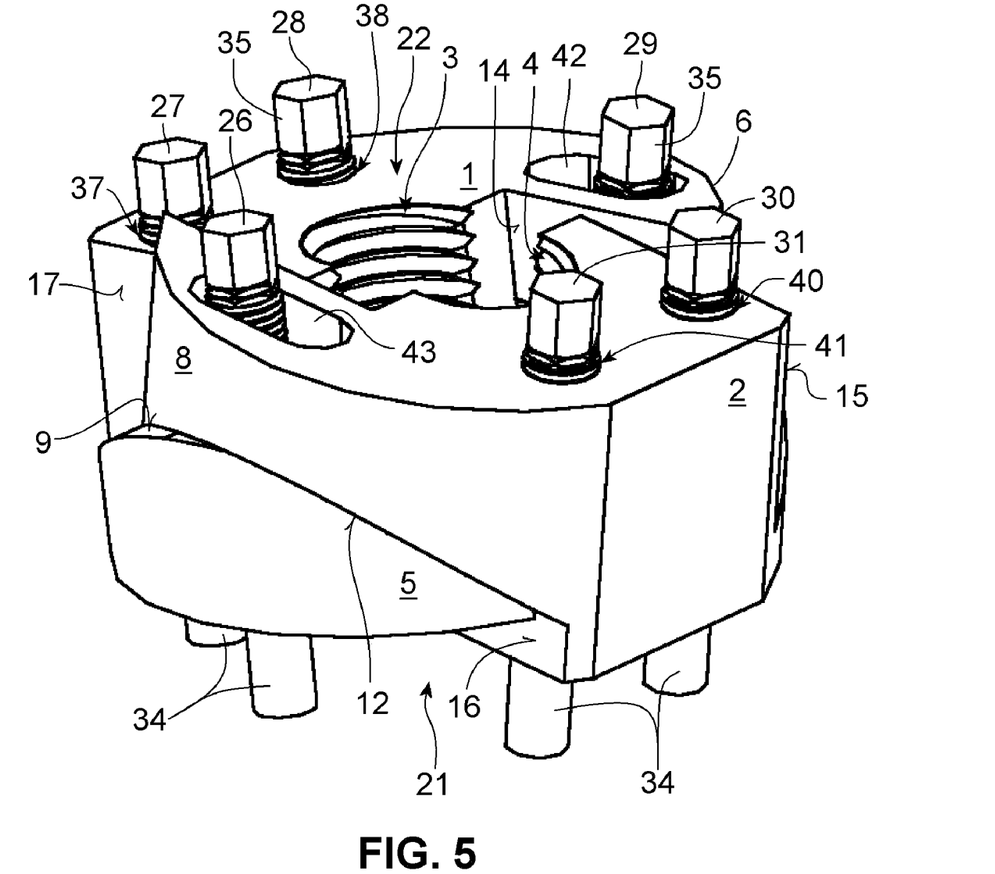
FIG. 5 shows an enlarged and isolated three-dimensional representation of the nut from FIG. 4 in the open position.
Figure 6:
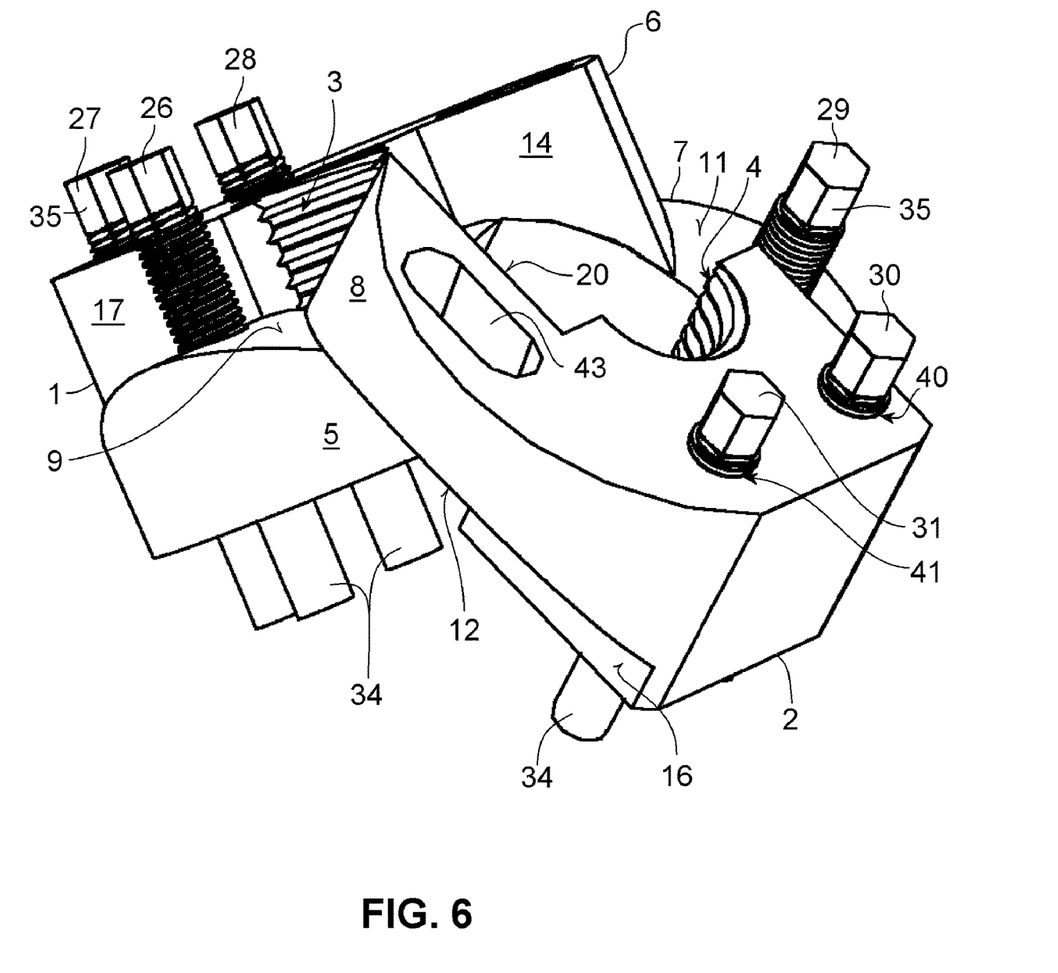
FIG. 6 shows a lateral three-dimensional representation of the nut parts of the nut of FIG. 5, which are further displaced relative to each other along the cylindrically curved guide surfaces.
Figure 7:
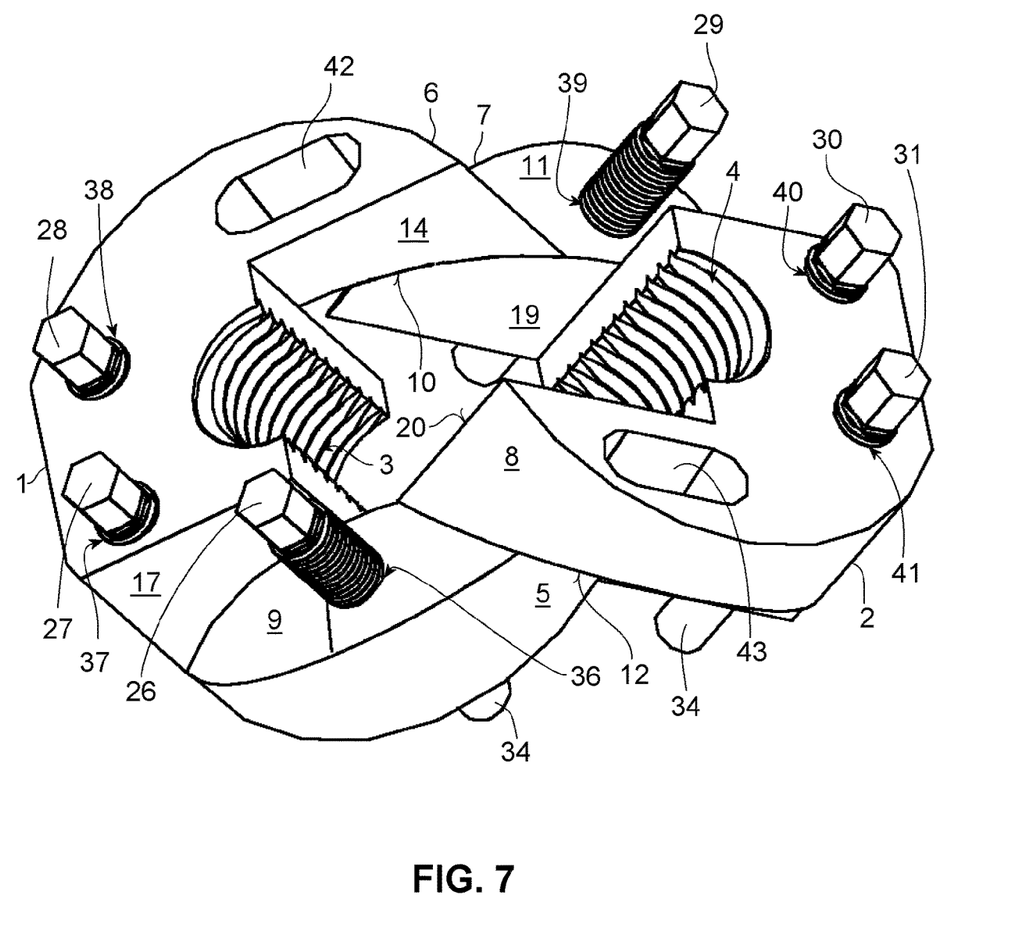
FIG. 7 shows a three-dimensional oblique plan view of the nut from FIG. 6.

The pivoting along the cylindrically curved guide surfaces 9-12 causes the axial end surfaces in the direction of the axis of the internal thread, i.e. the upper side 22 and the lower side 21 of the nut, to deviate from their flat configuration in the use position (see FIGS. 4-6). Consequently, pivoting and loosening of the nut from an external thread 25 onto which the internal thread of the closed nut is screwed is blocked when first axial end surface, in the drawings the lower surface 21, is supported against a supporting surface 23 by screwing tightly onto the external thread 25 via pressure screws 26-31 described further below.

The movement sequence when connecting the nut parts 1, 2 of the nut is as follows. The nut parts 1, 2 are displaced relative to each other at right angles to the parting plane of the closed internal thread and are pivoted about an axis of rotation running in the parting plane 25 of the internal thread and extending at right angles to the thread axis.

The nut further has pressure screws 26-31, which can be used to set a predefined pressure force with which the nut is supported against the supporting surface 23. FIGS. 1 to 4 schematically show a rectangular section 32 of a housing wall to which the external thread 25 is attached. An annular washer 33 surrounds the external thread 25 and forms the supporting surface 23 on which the pressure screws 26-31 are supported. At an end of each pressure screw 26-31 near the supporting surface 23, each pressure screw 26-31 has a pressure section 34 which is free of threads. At an opposite end of each pressure screw 26-31, each pressure screw 31-36 has a receiving means 35 for a screwing tool. In the drawings, each pressure screw 26-31 is provided with a hexagonal receiving means 35 for a wrench. Other known receiving means for screwdriving tools (Allen, Torx) can be selected. The pressure sections 34 and receiving means 35 are only occasionally provided with reference signs in the drawings.

Figure 8:
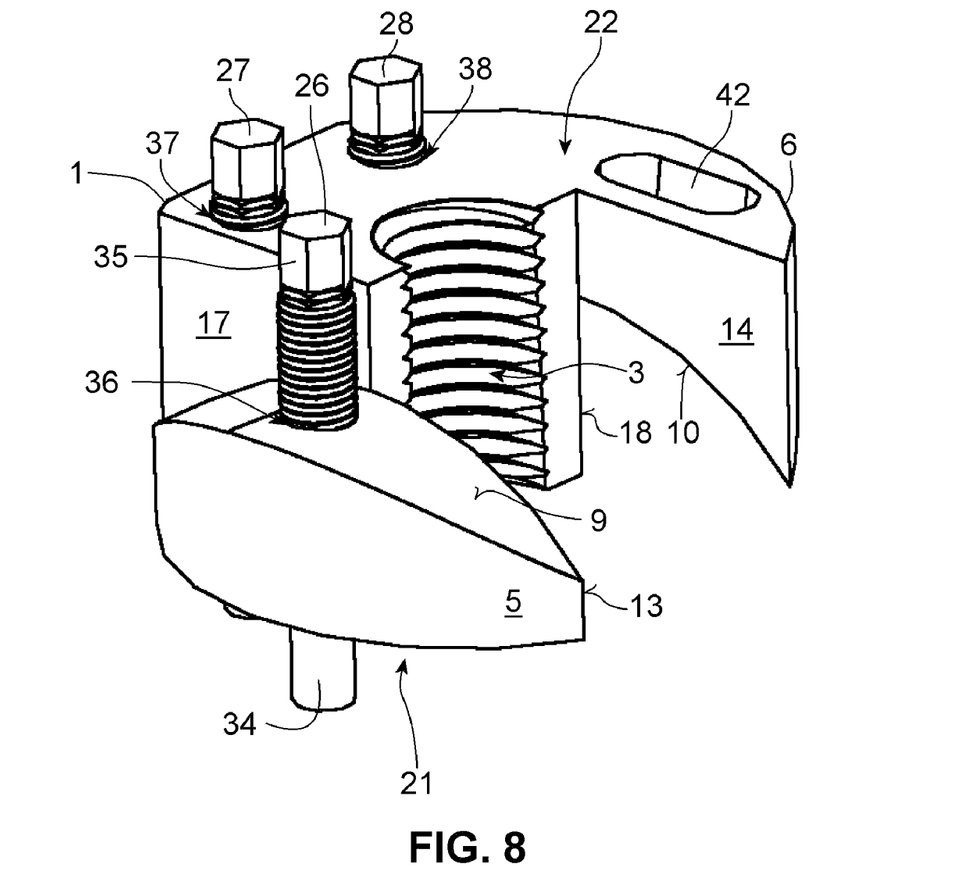
FIG. 8 shows an isolated representation of the first nut part of the nut from FIGS. 5-7.
Figure 9:
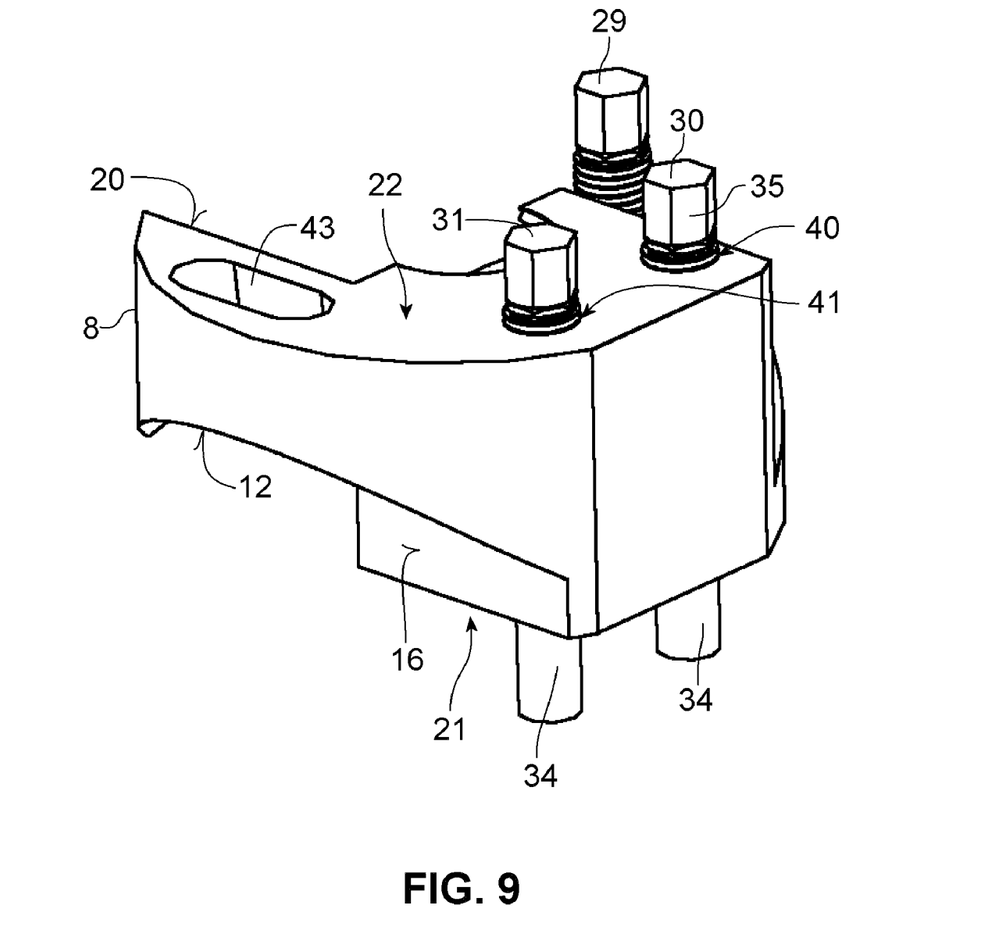
FIG. 9 shows an isolated representation of the second nut part of the nut from FIGS. 5-7.

In FIG. 8, it can be seen that the nut part 1 has two pressure screws 27, 28 which extend in a material section which extends from the upper side 22 to the lower side 21 of the nut. Pressure threads 37, 38 are provided for these pressure screws 27, 28, which can extend from the upper side 22 of the nut to its lower side 21. However, the length of the pressure threads 37, 38 may be less than the length of the bore through the nut. The bore may also have sections without threads.

In contrast, the pressure screw 26 is screwed into a pressure thread 36, which extends only from the underside 21 of the nut to the curved guide surface 9 of the locking arm 5. Similarly, it can be seen in FIG. 9 that the two pressure screws 30, 31 are received in pressure threads 40, 41 which extend from the upper surface 22 to the lower surface 21 of the nut. In contrast, the pressure screw 29 is screwed into a pressure thread 39 which extends through the locking arm 7 of the second nut part 2 from the underside 21 to the curved guide surface 11 (see also FIG. 7).

To enable the arrangement of the pressure screws 26-31 in the area of the locking arms 5-9, the second locking arms 6, 8 located on the upper side 22 of the nut each have a recess 42, 43 through which project the corresponding pressure screws 29, 26 in the pressure threads 39, 36 of the locking arms 7, 5. The recesses 42, 43 are formed as elongate holes, the width of which is slightly larger than the diameter of the pressure screw 29, 26 projecting through them. The center line of each of the elongate holes 42, 43 extends straight and parallel to the displacement direction in which the nut parts 1, 2 are displaced relative to each other. In particular, it can be seen in FIG. 7 that the nut parts 1, 2 cannot be joined together with pressure screws 26, 29 screwed into the first locking arms 5, 7. To join the nut parts 1, 2 together, it is necessary to remove the pressure screws 26, 29 from the pressure threads 36, 39 of the locking arms 5, 7. Only when the nut parts 1, 2 have been joined together in the open position shown in FIG. 5, in which the elongate holes 42, 43 in the second locking arms 6, 8 are aligned with the pressure threads 39, 36 in the first locking arms 7, 5, can the pressure screws 29, 26 be inserted through the elongate holes 42, 43 and screwed into the pressure threads 39, 36. The pressure screws 26, 29 screwed into the first locking arms 5, 7 on the underside 21 of the nut fix the nut part 2 to the nut part 1, so that only a displacement from the open position shown in FIG. 5 to the use position shown in FIG. 1 is possible.

In the closed use position shown in FIG. 1, the nut can be tightened along the external thread 25 toward the supporting surface 23 until the pressure sections 34 of the pressure screws 26-31 rest against the supporting surface 23. No particularly large force is required for this. The simple contact of the pressure sections 34 of the pressure screws 26-31 against the supporting surface 23 is sufficient to prevent the nut parts 1, 2 from pivoting and opening. Now, a screwdriving tool (wrench, not shown) can be used to apply torque to the pressure screws 26-31 by means of the hexagonal sockets 35 of the pressure screws 36-31, so that the pressure force on the supporting surface 23 increases. The torque for tightening the pressure screws 26-31 to produce a certain compressive force is much less than a corresponding torque for producing the same compressive force by turning the nut itself on the external thread 25. It should be noted that the pressure portions 34 of the pressure screws 26-31 do not necessarily have to bear on an annular washer 33. If the housing wall section 32 to which the external thread 25 is attached has sufficient stability, the pressure sections 34 of the pressure screws 26-31 can also bear directly on the housing wall section 32.

The features of the invention disclosed in the present description, in the drawings as well as in the claims may be essential, both individually and in any combination, for the realization of the invention in its various embodiments. The invention is not limited to the embodiments described. It may be varied within the scope of the claims and with due regard to the knowledge of the person skilled in the art.

The invention claimed is:

1. A nut, comprising:
an internal threat; and
two nut parts, each of the nut parts having a section of the internal thread which is radially slidable onto an external thread, the nut parts having co-operating connecting elements which permit relative displacement of the nut parts in a direction running radially to the axis of the internal thread until reaching a use position in which the internal thread of the nut engages around the external thread with a small clearance, wherein the connecting elements have guide surfaces which guide the nut parts in a rotational movement about an axis of rotation extending transversely to the axis of the internal thread when displaced into the use position, wherein each nut part has at least one first locking arm which has on one side a guide surface which induces the rotational movement when the nut parts are displaced and bears against a complementary guide surface on a second locking arm of the other nut part, wherein the nut has a plurality of pressure threads which are arranged around the internal thread and which receive pressure screws that can be screwed out in the axial direction from a first axial end face of the nut and have a receiving means for a screwing tool in the region of a second axial end face of the nut, wherein at least one pressure thread is arranged in the first locking arm, which has the first axial end face, and wherein the second locking arm with the second axial end face, which cooperates with the first locking arm, has a recess, through which the pressure screw projects.

2. The nut according to claim 1, wherein the recess is an elongated hole which guides the pressure screw when the second nut part is displaced with respect to the first nut part out of the use position.

3. The nut according to claim 2, wherein the pressure screw, which projects through the elongated hole of the second locking arm and is screwed into the pressure thread of the first locking arm, connects the two nut parts displaceably but inseparably to one another.

4. The nut according to claim 3, wherein the internal thread sections of the two nut parts are separated along a parting plane extending in the direction of the thread axis, and each nut part of the nut has two locking arms arranged on either side of a central plane extending perpendicular to the parting plane.

5. The nut according to claim 3, wherein the guide surfaces are inclined or curved.

6. The nut according to claim 3, wherein each nut part has at least one pressure thread in a region in which the nut part extends from the first axial end face to the second axial end face.

7. The nut according to claim 2, wherein the internal thread sections of the two nut parts are separated along a parting plane extending in the direction of the thread axis, and each nut part of the nut has two locking arms arranged on either side of a central plane extending perpendicular to the parting plane.

8. The nut according to claim 2, wherein the guide surfaces are inclined or curved.

9. The nut according to claim 2, wherein each nut part has at least one pressure thread in a region in which the nut part extends from the first axial end face to the second axial end face.

10. The nut according to claim 1, wherein the internal thread sections of the two nut parts are separated along a parting plane extending in the direction of the thread axis, and each nut part of the nut has two locking arms arranged on either side of a central plane extending perpendicular to the parting plane.

11. The nut according to claim 10, wherein the guide surfaces are inclined or curved.

12. The nut according to claim 10, wherein each nut part has at least one pressure thread in a region in which the nut part extends from the first axial end face to the second axial end face.

13. The nut according to claim 1, wherein the guide surfaces are inclined or curved.

14. The nut according to claim 13, wherein the internal thread sections of the two nut parts are separated along a parting plane extending in the direction of the thread axis, and each nut part of the nut has two locking arms arranged on either side of a central plane extending perpendicular to the parting plane.

15. The nut according to claim 13, wherein each nut part has at least one pressure thread in a region in which the nut part extends from the first axial end face to the second axial end face.

16. The nut according to claim 1, wherein each nut part has at least one pressure thread in a region in which the nut part extends from the first axial end face to the second axial end face.

17. The nut according to claim 16, wherein the internal thread sections of the two nut parts are separated along a parting plane extending in the direction of the thread axis, and each nut part of the nut has two locking arms arranged on either side of a central plane extending perpendicular to the parting plane.

18. The nut according to claim 16, wherein the guide surfaces are inclined or curved.

* * * * *